US010111314B2

(12) United States Patent
Eckert et al.

(10) Patent No.: US 10,111,314 B2
(45) Date of Patent: Oct. 23, 2018

(54) ENERGY GENERATION BY IGNITING FLAMES OF AN ELECTROPOSITIVE METAL BY PLASMATIZING THE REACTION GAS

(71) Applicant: Siemens Aktiengesellschaft, Munich (DE)

(72) Inventors: Helmut Eckert, Roettenbach (DE); Renate Elena Kellermann, Erlangen (DE); Marek Maleika, Fuerth (DE); Manfred Ruehrig, Lauf a.d. Pegnitz (DE); Guenter Schmid, Hemhofen (DE); Dan Taroata, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/511,253

(22) PCT Filed: Sep. 16, 2015

(86) PCT No.: PCT/EP2015/071154
§ 371 (c)(1),
(2) Date: Mar. 15, 2017

(87) PCT Pub. No.: WO2016/046029
PCT Pub. Date: Mar. 31, 2016

(65) Prior Publication Data

US 2017/0311432 A1 Oct. 26, 2017

(30) Foreign Application Priority Data

Sep. 24, 2014 (DE) ........................ 10 2014 219 275

(51) Int. Cl.
*B23K 10/00* (2006.01)
*H05H 1/48* (2006.01)
(Continued)

(52) U.S. Cl.
CPC ................ *H05H 1/48* (2013.01); *H05H 1/34* (2013.01); *H05H 1/42* (2013.01); *F02P 9/007* (2013.01);
(Continued)

(58) Field of Classification Search
CPC .. H05K 1/48; H05H 1/34; H05H 1/42; H05H 2001/3468; H05H 2001/3484; F02P 9/007
(Continued)

(56) References Cited

U.S. PATENT DOCUMENTS 3,594,609 A * 7/1971 Vas ........................ B05B 7/226 219/121.39
5,206,481 A 4/1993 Rossner et al. .......... 219/121.48
(Continued)

FOREIGN PATENT DOCUMENTS

CN 200980199 Y 11/2007 ............... H05H 1/26
CN 102497721 A 6/2012 ............... H05H 1/34
(Continued)

OTHER PUBLICATIONS

German Office Action, Application No. 102014219275.7, 9 pages, dated Jun. 10, 2015.
(Continued)

*Primary Examiner* — Mark Paschall
(74) *Attorney, Agent, or Firm* — Slayden Grubert Beard PLLC

(57) ABSTRACT

The present disclosure relates to generating energy. The teachings thereof may be embodied in methods for burning a reaction gas with an electropositive metal. An method for generating energy may include: supplying a reaction gas and an electropositive metal separately to at least one nozzle; wherein the electropositive metal is selected from alkali metals, alkaline earth metals, aluminum, zinc, mixtures, and/or alloys thereof; burning the reaction gas with the
(Continued)

electropositive metal; and coverting the reaction gas before or during burning at least temporarily into a plasma.

14 Claims, 4 Drawing Sheets

(51) Int. Cl.
*H05H 1/34* (2006.01)
*H05H 1/42* (2006.01)
*F02P 9/00* (2006.01)

(52) U.S. Cl.
CPC ............... *H05H 2001/3468* (2013.01); *H05H 2001/3484* (2013.01)

(58) Field of Classification Search
USPC ........ 219/121.36, 121.5, 121.51, 121.48, 75, 219/121.47, 76.16
See application file for complete search history.

(56) References Cited

U.S. PATENT DOCUMENTS

| | | | | |
|---|---|---|---|---|
| 5,935,460 | A * | 8/1999 | Mori | B23H 1/00 219/121.39 |
| 2002/0069828 | A1 * | 6/2002 | Penelon | C23C 16/453 118/723 MP |
| 2003/0113481 | A1 * | 6/2003 | Huang | C23C 14/0623 427/580 |
| 2006/0289397 | A1 * | 12/2006 | Mahawili | H05H 1/42 219/121.5 |
| 2009/0261081 | A1 | 10/2009 | Girold et al. | 219/121.49 |
| 2013/0192979 | A1 * | 8/2013 | Xu | F23C 99/001 204/164 |
| 2013/0260263 | A1 | 10/2013 | Schmid | 429/400 |
| 2014/0023856 | A1 | 1/2014 | Bisges et al. | 428/329 |
| 2015/0101454 | A1 | 4/2015 | Shimizu et al. | 75/331 |

FOREIGN PATENT DOCUMENTS

| | | | | |
|---|---|---|---|---|
| DE | 1213906 | B | 4/1966 | H02K 44/08 |
| DE | 4022111 | A1 | 1/1992 | B23K 10/00 |
| DE | 10327911 | B4 | 4/2008 | B23K 10/02 |
| DE | 102008031437 | A1 | 1/2010 | C05D 9/00 |
| DE | 102009004968 | A1 | 7/2010 | H05H 1/26 |
| WO | 01/78471 | A1 | 10/2001 | B01J 19/08 |
| WO | 2010/127344 | A2 | 11/2010 | G21K 5/00 |
| WO | 2012/038330 | A2 | 3/2012 | B01D 53/62 |
| WO | 2012/123530 | A1 | 9/2012 | B05B 7/22 |
| WO | 2013/156476 | A1 | 10/2013 | H01D 53/50 |
| WO | 2013/157454 | A1 | 10/2013 | B22F 9/12 |
| WO | 2016/046029 | A1 | 3/2016 | H05H 1/26 |

OTHER PUBLICATIONS

International Search Report and Written Opinion, Application No. PCT/EP2015/071154, 11 pages, dated Dec. 14, 2015.
Russian Office Action, Application No. 2017109671/07, 7 pages, dated Apr. 12, 2018.
Chinese Office Action, Application No. 201580051375.3, 7 pages, dated Jul. 4, 2018.

* cited by examiner

ENERGY GENERATION BY IGNITING FLAMES OF AN ELECTROPOSITIVE METAL BY PLASMATIZING THE REACTION GAS

CROSS-REFERENCE TO RELATED APPLICATIONS

This application is a U.S. National Stage Application of International Application No. PCT/EP2015/071154 filed Sep. 16, 2015, which designates the United States of America, and claims priority to DE Application No. 10 2014 219 275.7 filed Sep. 24, 2014, the contents of which are hereby incorporated by reference in their entirety.

TECHNICAL FIELD

The present disclosure relates to generating energy. The teachings thereof may be embodied in methods for burning a reaction gas with an electropositive metal.

BACKGROUND

As a result of the need to reduce carbon dioxide emissions, recent times have seen discussion of various possibilities for the generation of energy from alternative resources. DE102008031437.4 describes how, using electropositive metals, it is possible to create completely recyclable energy circuits. These circuits were set out in more detail in WO2012/038330 and WO2013/156476. In the energy circuits described therein, the discharge of energy is accomplished through the burning of electropositive metals, such as lithium, sodium, potassium, magnesium, calcium, strontium, barium or else aluminum or zinc, in a gas atmosphere such as, for example, air or else carbon dioxide ($CO_2$).

The reaction of the electropositive metal with the reaction gas and the initiation of the reaction are both challenges inherent in these methods. Customarily, electropositive metals and especially alkali metals are ignited thermally. The metal is heated to the required ignition temperature by means of a gas flame or electrical heating. Alkali metals are also capable of self-ignition, and on contact with water, in the case of rubidium and cesium, simple air contact is enough to make this happen, for example.

Another area of use of the burning of metals is in aerospace technology. Here, among other species, metals serve as propellant for solid-fuel rockets. Ignition here takes place generally thermally by means of an ignition charge, which generates heat by burning.

SUMMARY

The teachings of the present disclosure may be embodied in methods for burning a reaction gas with an electropositive metal, where the electropositive metal is selected from alkali metals, alkaline earth metals, aluminum, and zinc and also mixtures and/or alloys thereof, and where the reaction gas, before and/or during burning, is converted at least temporarily into a plasma, for the purpose, for example, of ignition of the reaction gas, and/or an apparatus for implementing the method.

BRIEF DESCRIPTION OF THE DRAWINGS

The appended drawings are intended to illustrate embodiments of the present disclosure and to convey a further understanding thereof. In association with the description, they explain concepts and principles, but do not limit the scope or applications thereof. Other embodiments and many of the stated advantages are apparent in relation to the drawings. The elements in the drawings are not necessarily shown true to scale with one another. Identical, functionally identical, and equivalent elements, features, and components are each provided with the same reference symbols in the figures of the drawings, unless otherwise stated.

Figure 3:
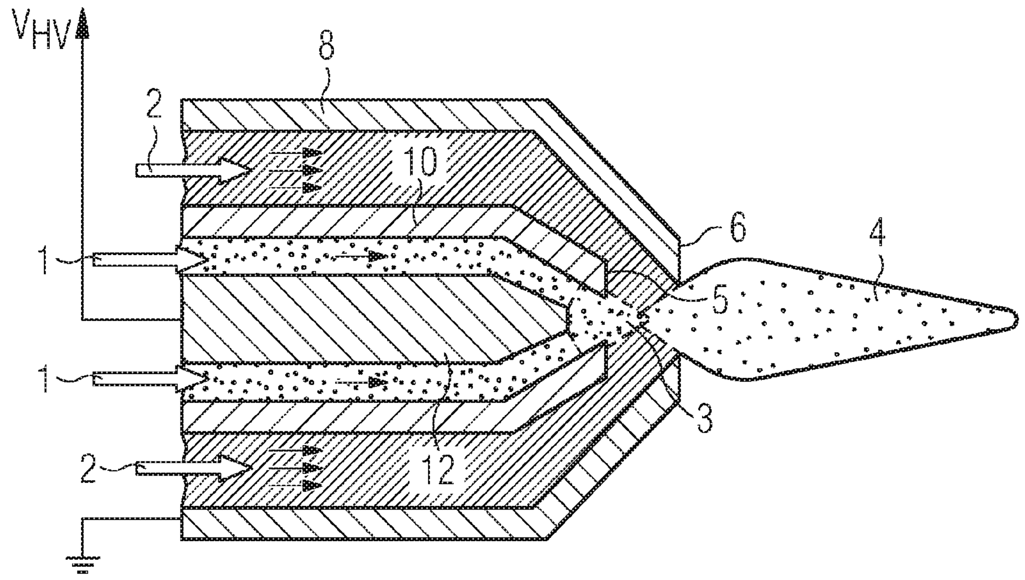

Shown in FIG. 3 schematically is an inverse construction with internal plasma nozzle and external liquid-metal atomization, in accordance with teachings of the present disclosure.

FIG. 4 shows, again schematically, a liquid-metal nozzle with plasma ignition, with a detailed view of the high-voltage (HV) discharge, in accordance with teachings of the present disclosure.

Figure 5:
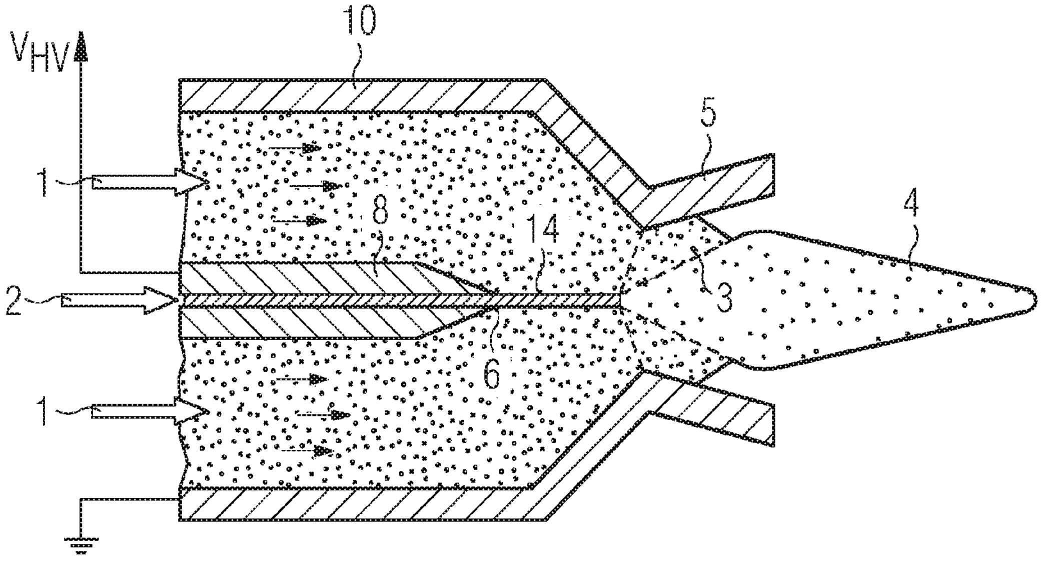

FIG. 5 shows a liquid-metal nozzle with plasma ignition, schematically, wherein the liquid-metal jet serves as electrode, in accordance with teachings of the present disclosure.

Figure 6:
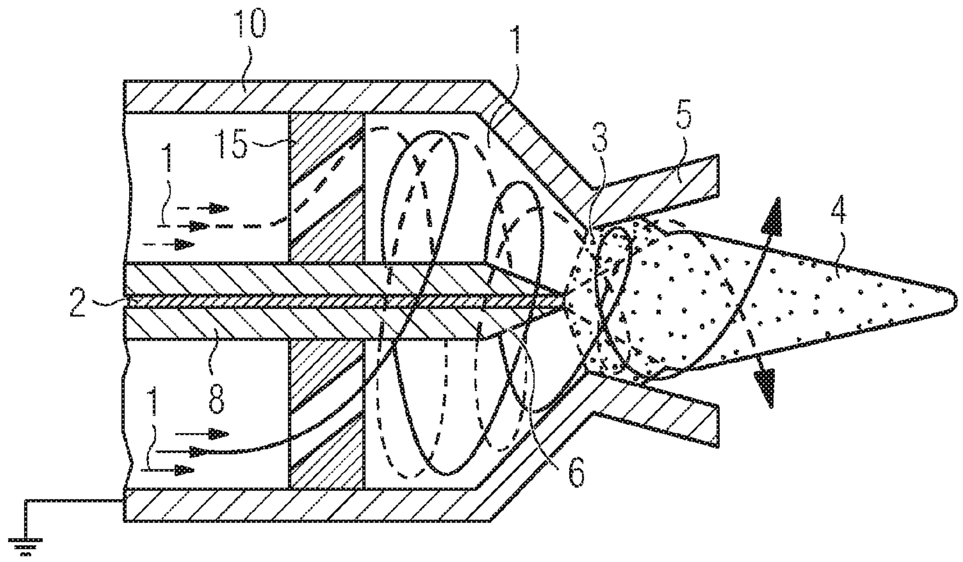

FIG. 6 shows schematically a plasma nozzle with swirl disk and internal liquid-metal nozzle, in accordance with teachings of the present disclosure.

Figure 7:
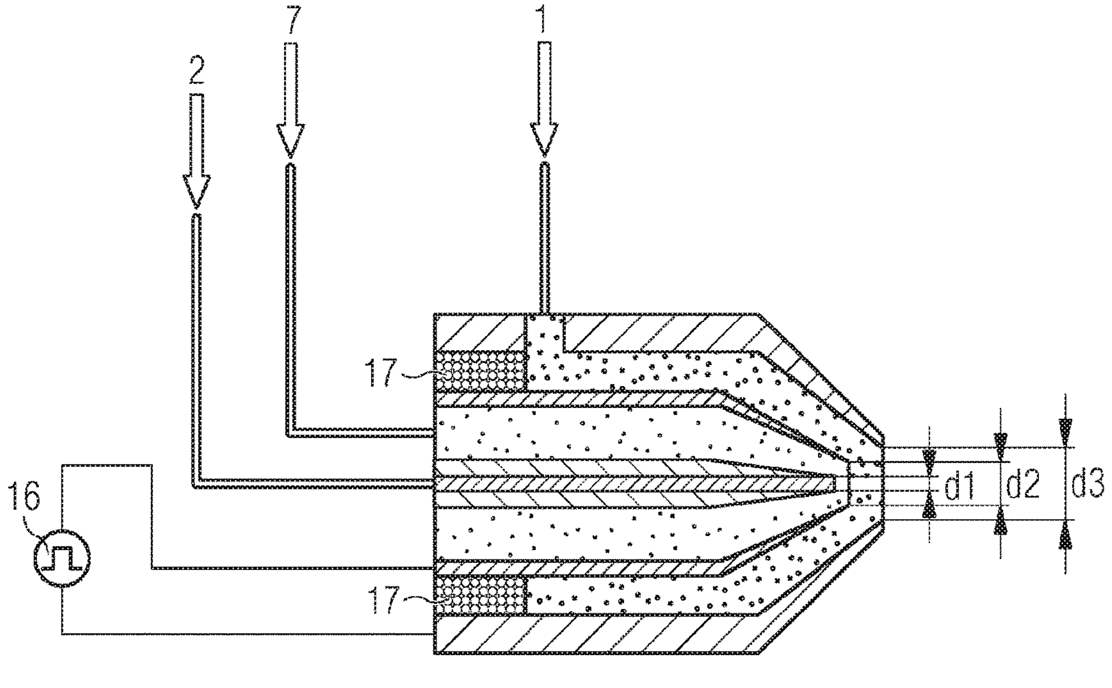

FIG. 7 shows an exemplary apparatus with a two-fluid nozzle for liquid-metal atomization, with plasma ignition, in accordance with teachings of the present disclosure.

DETAILED DESCRIPTION

In internal combustion engines, a gasoline/air mixture may ignited by electrical spark discharge between the electrodes of a spark plug, in which the fuel/air mixture is heated locally and briefly to 3000 to 6000 K. For a stable, self-sustaining flame to be formed, there must be an ignitable mixture present in the region of the igniting electrodes; secondly, the thermal energy transferred to the mixture by the plasma between the electrodes must be greater than the losses at the electrodes. During this phase, the ionized gas between the electrodes attains temperatures of around 6000 K. At relatively high flow rates and/or with cold reaction gas, however, such ignition is not always reliable.

To ignite very slow reacting fuel/air mixtures, such as lean mixtures or mixtures with a high exhaust-gas fraction, for example, it is necessary to couple a higher energy into the gas mixture and/or to ignite a greater volume of mixture than is required in the case of stoichiometric mixtures. This can be achieved by higher electrical energies or by a higher efficiency of the coupling-in of energy. Limits to the increase in the electrical energy are imposed by electrode erosion (wear, spark-plug lifetime, etc.).

Plasma-jet ignition systems may form the plasma by spark discharge in a small cavity of the igniter. The plasma enters the combustion chamber from an opening in the igniter, in the form of a jet, where it ignites a large mixture volume. The spark plug has virtually the same external geometric dimensions as a conventional hooked spark plug. The difference lies in the spark plug tip facing the combustion chamber which instead of a free-standing middle electrode and mass electrode possesses a relatively small cavity which is opened toward the combustion chamber.

Plasma cutters may include a plasma burner, wherein the air is heated to an extremely high temperature by means of an electrical arc (HV discharge). This forms an electrically conductive plasma, through which the cutting stream flows from the electrode in the interior of the plasma cutting burner to the workpiece (anode). In the plasma arc, temperatures of up to 30 000° C. are developed. The cutting nozzle, with a small bore, constricts the cutting stream so as to produce a highly bundled plasma cutting jet. This plasma arc melts metals very quickly and has a high kinetic energy that causes the melt to be thrown out of the cutline. The result is a clean and smooth cut.

Plasma generation within a nozzle may achieve an improved reaction regime and an improved reaction between the reaction gas and the electropositive metal. Utilizing the reaction gas directly as plasma gas, in other words as the gas for generating the plasma, may remove the need for additional plasma gas, thereby simplifying the reaction regime and also allowing byproducts of the plasma gas to be avoided. Furthermore, the energy input necessary for igniting the electropositive metal can take place in a targeted way into the reaction gas, this being significantly more efficient than, for example, heating via thermal radiation, by means of electrical heating, or by gas flame. In particular, by using the nozzle as 1st electrode and the metal jet as 2nd electrode for plasma ignition, the methods may generate a plasma which, even at high flow rates of the electropositive metal, enables an effective reaction between electropositive metal and reaction gas.

In some embodiments, methods may include burning a reaction gas with an electropositive metal, wherein the electropositive metal is selected from alkali metals, alkaline earth metals, aluminum and zinc, and also mixtures and/or alloys thereof, where the reaction gas, before and/or during burning, is converted at least temporarily into a plasma, and wherein the reaction gas and the electropositive metal are supplied by supply means separately, preferably coaxially, to at least one nozzle, and the reaction gas supplied within the at least one nozzle is converted at least temporarily into a plasma, for the purpose, for example, only of igniting the reaction gas.

In some embodiments, an apparatus for burning a reaction gas with an electropositive metal, where the electropositive metal is selected from alkali metals, alkaline earth metals, aluminum and zinc, and also mixtures and/or alloys thereof, may include: at least one nozzle to atomize a mixture of electropositive metal and reaction gas, a first supply means for the electropositive metal, to supply the electropositive metal to the at least one nozzle, a second supply means for the reaction gas, to supply the reaction gas to the at least one nozzle, and an ignition device on and/or in the at least one nozzle, which converts the reaction gas within the at least one nozzle at least temporarily into a plasma.

Some embodiments of the present disclosure may include a method for burning a reaction gas with an electropositive metal, wherein the electropositive metal is selected from alkali metals, alkaline earth metals, aluminum and zinc, and also mixtures and/or alloys thereof, where the reaction gas, before and/or during burning, is converted at least temporarily into a plasma, and wherein the reaction gas and the electropositive metal are supplied by supply means separately, e.g., coaxially, to at least one nozzle, and the reaction gas supplied within the at least one nozzle is converted at least temporarily into a plasma, for the purpose, also for example, of igniting the reaction gas.

The electropositive metal may be selected from alkali metals, e.g., Li, Na, K, Rb and Cs, alkaline earth metals, e.g., Mg, Ca, Sr and Ba, Al, and Zn, and also mixtures and/or alloys thereof. In some embodiments the electropositive metal is selected from Li, Na, K, Mg, Ca, Al and Zn. Also possible are mixtures and/or alloys of the electropositive metal.

The reaction gas may comprise gases which react with the stated electropositive metal and/or with mixtures and/or alloys of the electropositive metals in an exothermic reaction. By way of example, the reaction gas may comprise air, oxygen, carbon dioxide, hydrogen, steam, nitrogen oxides NOx such as dinitrogen monoxide, nitrogen, sulfur dioxide, and/or mixtures thereof. The method may be used for desulfurization and/or NOx removal. Depending on the reaction gas, different products may be obtained here with the different electropositive metals, and may be obtained as solid, as liquid and also in gaseous form.

In the case of a reaction of electropositive metal, lithium for example, with nitrogen it is possible, for the products formed to include metal nitride, such as lithium nitride, which can then be later left to undergo further reaction to ammonia; conversely, on reaction of electropositive metal, e.g., lithium, with carbon dioxide, the reaction products may include, for example, metal carbonate, e.g., lithium carbonate, carbon monoxide, metal oxide, e.g., lithium oxide, or else metal carbide, e.g. lithium carbide, and also mixtures thereof, and from the carbon monoxide it is possible with hydrogen to obtain products of higher value including, for example, longer-chain, carbon-containing products such as methane, ethane, etc. up to benzine, diesel, but also methanol, etc., in a Fischer-Tropsch process, for example, while from metal carbide, e.g., lithium carbide, it is possible to obtain acetylene, for example. With dinitrogen monoxide as combustion gas, furthermore, it is also possible for metal nitride, for example, to be formed. Analogous reactions may also arise for the other stated metals.

The energy to start the reaction can be introduced by the at least temporary conversion into a plasma. It is sufficient if the reaction is started by conversion of the reaction gas to plasma, with the electropositive metal then being introduced at the same time or thereafter. Subsequently, the reaction gas may or may not be present in plasma form. The reaction may also be started during the feeding of electropositive metal and reaction gas, by conversion of the reaction gas into a plasma.

In some embodiments, the reaction gas, before or during its supply for plasma conversion, may also be swirled to mix more thoroughly with the electropositive metal and to stabilize the plasma flame, using swirl elements or swirl disks, for example.

By supply through separate supply means, it is possible to achieve striking of the reaction into the supply means. Through coaxial supply, the reactants can be supplied quickly and easily to the reaction, and effective mixing can be ensured and the reaction can be further improved as well.

Furthermore, the plasma within the nozzle may be generated, for example, by high voltage or by supply of thermal energy or by other means, as for example by direct-voltage sparking, by means of focused laser beams, or using the pinch effect. More particularly, plasma generation may take place by high voltage, with the nozzle constituting one of the electrodes.

In some embodiments, the plasma is generated within the at least one nozzle by high-voltage discharge (HV discharge) in the range from 4 to 100 kV, e.g., 4 to 10 kV, by ignition of the reaction gas, for example, with the nozzle serving as one electrode. The high voltage here may be present with or without an alternating electrical field.

In the case of an alternating field, the frequency may for example be 0 Hz (DC), 15-25 kHz, 40 kHz, 400 kHz, 13.65 MHz, or else any other frequency, in the microwave range, for example, it also being unnecessary for this frequency to remain fixed at one frequency. By ignition with high voltage it is possible to achieve rapid and targeted conversion to plasma. The energy coupled in is dependent on the high-frequency field of the current generated. In some embodiments, currents may be in the range of 1 mA-10 A, e.g., in the range of 10 mA-1000 mA.

The high voltage may be provided here, for example, by at least one high-voltage generator. Via high-voltage insulators and/or corresponding, suitable coating of the supply means, it is possible to prevent sparks reaching the supply means and to prevent premature ignition of the plasma, and to carry out localized ignition in the nozzle.

In some embodiments, the plasma emerges from the inside of the nozzle in the flow direction of the reaction gas. The nozzle and/or the supply means may be provided for this purpose, for example, in terms of its or their shape or arrangement, for example, or the mass flows may be set appropriately. It can be ensured that the plasma comes into contact with sufficient reaction gas.

After the ignition of the liquid metal, moreover, the high voltage may simply be switched off, and a flame of reaction gas and electropositive metal may continue to burn in a self-sustaining process. If the flame goes out, it can be reignited at any time by application of the high voltage.

In principle it is possible, independently of the specific nozzle construction, to switch the electrodes, as for example the electrical connection of the high-voltage connection and the corresponding ground connection. All that this implements is the buildup direction of the HV discharge, which, however, has no consequence for the process, as long as the plasma flame of the reaction gas is ignited appropriately.

In some embodiments, the nozzle is one of the electrodes, and the other electrode is located in the interior of the nozzle, as for example one of the other supply means or the electropositive metal itself, in order to achieve plasma ignition in a targeted manner in the interior of the nozzle and to ensure this quickly and efficiently, so that the electropositive metal can be efficiently ignited and reacted even when its flow rates are high, such as 0.1 g/s for small-scale installations up to 10 kg/s or more for large-scale installations, for example. For this purpose it is also possible, for example, to mount one electrode on the outer wall of the outermost supply means which comes into contact with the nozzle. For example, electrodes may be placed onto the outer and inner walls of the outer supply means in the nozzle to achieve ignition inside the nozzle.

Figure 4:
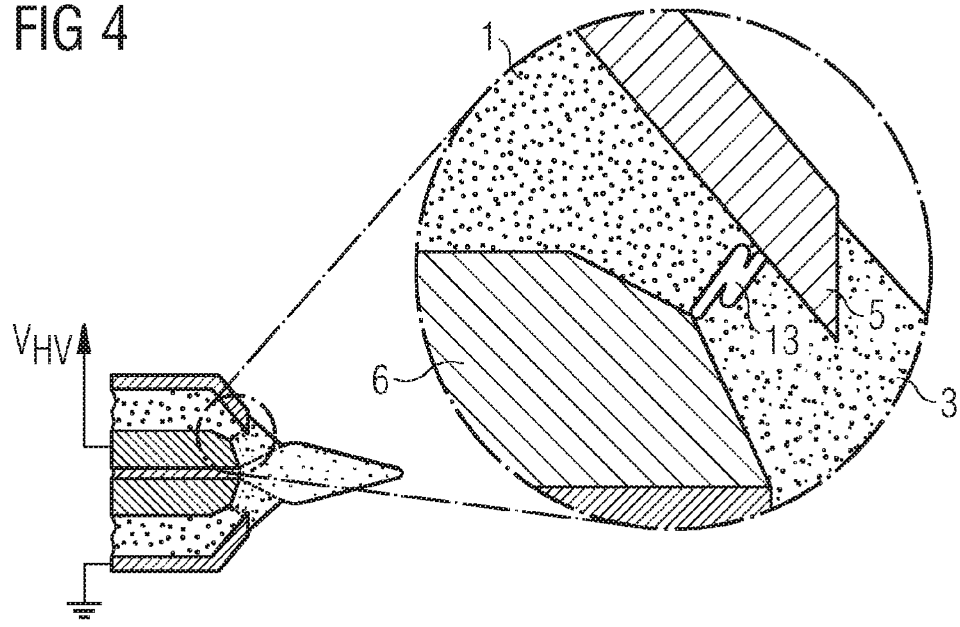

The actual local point of the high-voltage discharge and hence the point of plasma conversion of the reaction gas may be adjusted by way of the distance between anode and cathode, such as of a metal nozzle to the reaction gas nozzle, for example. This may be the point of the smallest distance between the electrodes, since it is there that the insulation pathway is the shortest and therefore there that an HV discharge comes about. For one exemplary embodiment, this is also illustrated in FIG. 4, and is set out in even more detail as part of the examples. By making one nozzle, or one of the two nozzles, of excessive height, it is possible to specify the point from which a plasma is formed from the reaction gas and the magnitude of the distance between the supply of electropositive metal, in the form of a liquid, for example, and the plasma point at which the plasma is formed. The plasma point in this context is not confined to one point, and may also occupy a certain region, as for example the region between the nozzles and/or supply means, which occupies the smallest distance between them.

In some embodiments, an atomizing gas is supplied to the at least one nozzle and the electropositive metal is atomized with the atomizing gas. The electropositive metal may be distributed more effectively in the plasma and/or in the reaction gas, and hence the reaction may be further improved. Moreover, through the supply of atomizing gas, it is also possible to control the exothermic reaction more effectively, as for example by transferring heat that is formed to the atomizing gas. Subsequently, electrical energy can also be obtained from this heat in the atomizing gas, with the assistance, for example, of at least one heat exchanger and/or at least one turbine having at least one generator. The heat may also be used otherwise, such as to preheat the electropositive metal and/or the reaction gas before supplying it to the nozzle, for example. Alternatively, the electropositive metal may also be atomized in another way, by means of swirl elements, for example, or else may be omitted.

In some embodiments the atomizing gas may correspond to or be different from the reaction gas. The atomizing gas may comprise, for example, air, carbon monoxide, carbon dioxide, oxygen, methane, hydrogen, steam, nitrogen, dinitrogen monoxide, mixtures of two or more of these gases, etc. Various gases, such as methane, for example, may serve here for heat transport and may take off the heat of the reaction of electropositive metal with the reaction gas from the nozzle. The various carrier gases—atomizing gases may be adapted appropriately, for example, to the reaction of the reaction gas with the electropositive metal in order in that case to achieve possible synergistic effects.

The rates of supply of reaction gas, electropositive metal, and atomizing gas may vary according to the reaction gas used, electropositive metal, and atomizing gas and of the reaction which then takes place, or plasma conversion which then takes place. By determining, for example, the reaction kinetics and reaction dynamics, by means of suitable simulations or of simple experiments with different flow rates, for example, it is possible for these to be determined appropriately.

In some embodiments, before being supplied into the at least one nozzle, the electropositive metal is liquefied or atomized and is supplied to the at least one nozzle in the form of liquid or particles. The particles may have a size such that their maximum length accounts for up to and including 20% of the nozzle diameter, the particles have any desired cross section. This allows the supply of the electropositive metal to be simplified and the reaction with the reaction gas to be facilitated. Also, the electropositive metal may be more easily atomized and distributed, thereby achieving an improved reaction. There is no particular limit here on the temperature of the liquid or of the particles, which may be set specifically in accordance with reaction regime. Depending on the electropositive metal, the supply here may take place in a variety of ways—in the case of the alkali metals, for example, liquid supply may be preferable, whereas alkaline earth metals may be supplied as powders/particles.

In some embodiments, through placement of a contact, the electropositive metal may serve as an electrode during plasma generation. The electropositive metal may be supplied, for example, as a string of easily atomizable solid material or as a liquid string, such as a viscous liquid string, and may be supplied through the supply means for the electropositive metal and thus introduced in the form of a string into the nozzle, meaning that this string comes to a very short distance from the nozzle and the metal string can therefore be subjected to high-voltage discharge at the nozzle when the voltage is appropriately applied.

In this way the high-voltage discharge can be targetedly localized and an effective reaction of the electropositive metal can be ensured from the start of supply, allowing additional losses to be prevented. Supply in the form of a liquid string or as a dense cloud of metal particles may allow the reaction to be started more easily and the distributing of the electropositive metal in the reaction gas after the start of reaction to be facilitated. In this context, it should be borne in mind that a dense cloud of metal particles is still to possess a sufficient overall conductivity to allow the effect to come about. The sparks can then simply jump over the particles. This overall conductivity may be varied according to the electropositive metal used, but may also be varied according to particle size and appropriately adjusted and/or determined, for example, by the electrical properties of the electropositive metal and by simulations and simple experiments. In some embodiments, a dense cloud of metal particles comprises 0.5-50 percent by mass, e.g., 10-20 percent by mass, of metal in relation to the mixture of all the constituents supplied, including, for example, electropositive metal, reaction gas, and atomizing gas.

The temperature of the liquid of the electropositive metal or of the metal particles may be set to control the reaction, depending on the properties of the electropositive metal and of the reaction gas, examples being energy given off during the reaction, density, and toughness of the electropositive metal at the stated temperature, etc.

Some embodiments may include an apparatus for burning a reaction gas with an electropositive metal, where the electropositive metal is selected from alkali metals, alkaline earth metals, aluminum and zinc, and also mixtures and/or alloys thereof. The apparatus may include at least one nozzle to atomize a mixture of electropositive metal and reaction gas, a first supply for the electropositive metal to supply the electropositive metal to the at least one nozzle, a second supply for the reaction gas to supply the reaction gas to the at least one nozzle, and an ignition device on and/or in the at least one nozzle, which converts the reaction gas within the at least one nozzle at least temporarily into a plasma.

In some embodiments, the at least one nozzle is capable of withstanding the reaction conditions during generation of the plasma and during reaction of the reaction gas with the electropositive metal. The nozzle may be suitably designed here depending on the nature of the reaction gas, the electropositive metal, the possible supply of an atomizing gas, the supply geometry, etc. For example, according to certain embodiments, the at least one nozzle may take the form of a one-fluid or two-fluid nozzle. Examples of suitable material for the nozzle may comprise materials selected from the group consisting of iron, chromium, nickel, niobium, tantalum, molybdenum, tungsten, zirconium, and alloys of these metals, and also steels such as stainless steel and chromium-nickel steel. These materials may be used at relatively high temperatures, at which the reaction with—for example—liquid electropositive metal can proceed more easily.

The first supply for the electropositive metal may include, e.g., tubes or hoses, or conveyor belts, which may be heated. The selection may depend on the basis, for example, of the aggregate state of the electropositive metal. Mounted optionally onto the first supply for the electropositive metal may also be a supply for a gas, optionally having a control means such as a valve, allowing the supply of the electropositive metal to be regulated.

The second supply for the reaction gas may include a tube or hose, etc., which may optionally be heated. The selection of the second supply may depend on the condition of the gas, which may optionally also be under pressure. It is also possible for a plurality of first and/or second supplies to be provided for the electropositive metal and/or the reaction gas.

The ignition device may be capable of converting the reaction gas into a plasma. The ignition device may include, e.g., a high-voltage source having a voltage in the range from 4 to 100 kV, e.g., 4 to 10 kV, which can be mounted on the nozzle. The high voltage here may be present with or without an alternating electrical field. In the case of an alternating field, the frequency may for example be 0 Hz (DC), 15-25 kHz, 40 kHz, 400 kHz, 13.65 MHz, or else any other frequency, in the microwave range, for example, it also being unnecessary for this frequency to remain fixed at one frequency. Ignition with high voltage may achieve rapid and targeted conversion to plasma. The energy coupled in may depend on the high-frequency field of the current generated. Currents in the range of 1 mA-10 A, e.g., in the range of 10 mA-1000 mA may be suitable. The ignition device may further comprise direct-voltage sparks, focused laser beams, and/or ignition devices using the pinch effect.

In some embodiments, the apparatus may further comprise a third supply to supply an atomizing gas to the at least one nozzle. The third supply may include a tube or hose, etc., which may optionally be heated, depending on the condition of the gas, which optionally may also be under pressure. It is also possible for a plurality of third supplies to be provided for atomizing gas.

In some embodiments, the first supply for the electropositive metal and/or the second supply for the reaction gas and/or the third supply for the atomizing gas open out in the at least one nozzle. As a result, the ignition and reaction can be localized within the nozzle. In some embodiments, at least the first supply and the second supply open out in the nozzle, and, for example, the atomizing gas may also be supplied to the electropositive metal beforehand. The supply means may be coaxial with one another and, thereby, obtain effective mixing of the electropositive metal and of the reaction gas and, optionally, of the atomizing gas. The supply, for example, may be square, rectangular and/or circular in cross section.

An apparatus may further comprise a melting device or a comminuting device for the electropositive metal to melt or comminute the electropositive metal before or in the first supply for the electropositive metal. This may facilitate the ignition and reaction, and also the mixing of electropositive metal and reaction gas. There is no particular restriction here on the nature of the melting or comminuting device, which may, for example, comprise heating systems, burners, etc., and mills, crushers, etc., respectively.

In some embodiments, the at least one nozzle includes a metal nozzle and/or a reaction gas nozzle and/or as an atomizing gas nozzle. The first supply for the electropositive metal opens out in the metal nozzle and/or the second supply for the reaction gas opens out in the reaction gas nozzle and/or the third supply for the atomizing gas opens out in the atomizing gas nozzle. Here, then, in some certain embodiments, the first supply for the electropositive metal may be disposed coaxially within the second supply for the reaction gas and the second supply for the reaction gas can open out in the reaction gas nozzle, which corresponds to the at least one nozzle. The first supply for the electropositive metal may be disposed within the at least one nozzle.

Analogous arrangements may include the at least one nozzle comprising a metal nozzle and the reaction gas in the second supply is disposed coaxially within the first supply for the electropositive metal, and/or for the case of an atomizing gas nozzle, the supply of electropositive metal and reaction gas proceeds coaxially within the third supply for the atomizing gas, and here as well the first and second supply means may be arranged, as above, within one another. For the case of the metal nozzle and/or reaction gas nozzle, the third supply may be arranged coaxially within the first and/or second supply, respectively, and in that case the third supply may be arranged within the other two supply means or between the two.

If the second supply for reaction gas is located inside, in some embodiments, a high-voltage electrode is disposed within said second supply, having a voltage of, for example, 4 to 100 kV, e.g., 4 to 10 kV, for generating a plasma. The high voltage here may include an alternating electrical field. In the case of an alternating field, the frequency may for example be 0 Hz (DC), 15-25 kHz, 40 kHz, 400 kHz, 13.65 MHz, or else any other frequency in the microwave range, for example. The frequency may vary over time. Ignition with high voltage may achieve rapid and targeted conversion to plasma. The energy coupled in may depend on the high-frequency field of the current generated.

The ignition device may include a high-voltage ignition device, comprising a high-voltage source, a high-voltage generator, for example—having a voltage in the range from 4 to 100 kV, which is connected to two electrodes, where i) the first supply for the electropositive metal, or the electropositive metal itself, and the second supply for the reaction gas, or ii) the first supply for the electropositive metal, or the electropositive metal itself, and the third supply for the atomizing gas, or iii) the second supply for the reaction gas, and the third supply for the atomizing gas, are each designed as one electrode, and the shortest distance between the respective electrodes is formed within the at least one nozzle. Because the shortest distance between the electrodes is formed within the nozzle, the ignition can be localized effectively within the nozzle.

In some embodiments, the electropositive metal includes an electrode such that after the supply by the first supply for the electropositive metal, it is passed as a coherent metal body or as a dense cloud of metal particles into the at least one nozzle, and the ignition device is formed by the at least one nozzle and the electropositive metal. In this case the first supply for the electropositive metal may be arranged within the second supply for the reaction gas. According to certain embodiments, a dense cloud of metal particles comprises 0.5 to 50 percent by mass, e.g., 10-20 percent by mass, of metal in relation to the mixture of all the constituents supplied—for example, electropositive metal, reaction gas, and, optionally, atomizing gas.

In some embodiments, the first and/or second and/or third supply may comprise elements such as swirl elements or swirl disks for swirling or better spraying of the reaction gas and electropositive metal and atomizing gas, respectively, in order to achieve better mixing. By this means it is also possible, for example, to achieve stabilization of the plasma, more particularly by swirling in the second supply means for the reaction gas.

The above embodiments, configurations, and developments can be combined with one another. Further possible configurations, developments, and implementations of the invention also encompass combinations not explicitly stated of with reference to the working examples. In particular, the skilled person will also add individual aspects, as improvements or supplements, to the respective basic form of the present teachings.

Figure 1:
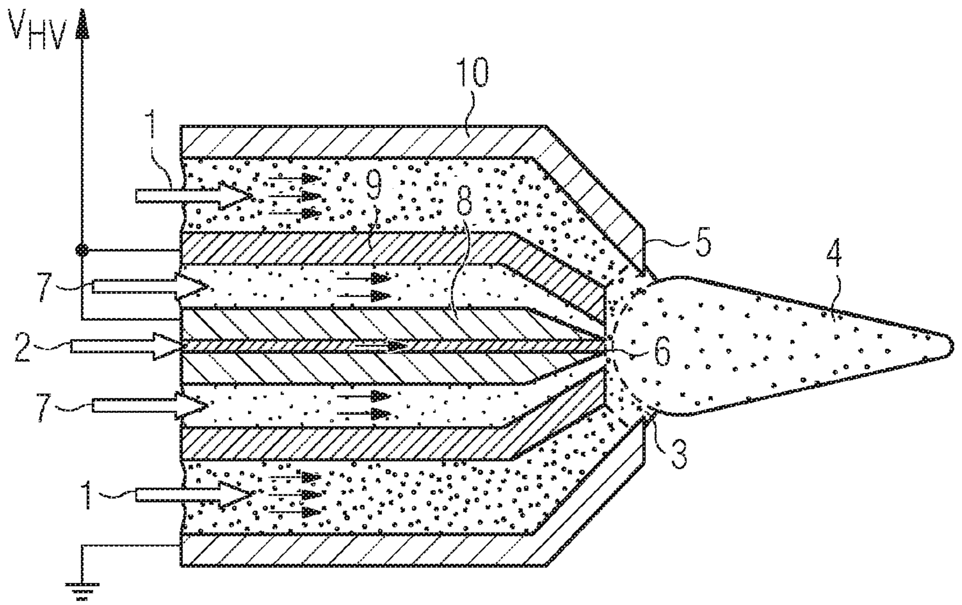
FIG. 1 shows schematically a two-fluid nozzle for metal atomization, as for example liquid-metal atomization, with plasma ignition, in accordance with teachings of the present disclosure.

An exemplary basis for an apparatus of the invention is formed by combination of a liquid-metal nozzle with a gas-plasma nozzle, to ignite the atomized liquid metal by means of controlled input of energy into the reaction gas necessary for burning. FIGS. 1 and show two possibilities for the construction of a metal nozzle/plasma nozzle combination of this kind, according to two exemplary embodiments.

Figure 2:
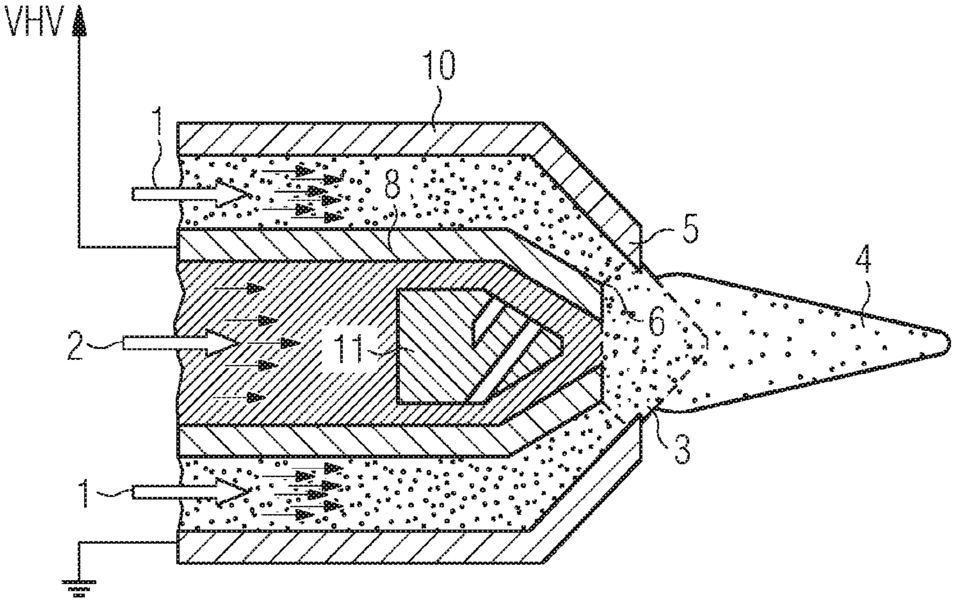
FIG. 2 illustrates schematically a one-fluid nozzle for liquid-metal atomization with plasma ignition, in accordance with teachings of the present disclosure.

The exemplary construction illustrated in FIGS. 1 and 2 comrpises a plasma nozzle/reaction gas nozzle 5 as a reaction gas nozzle for converting the reaction gas 1 into plasma, and a nozzle 6 for atomizing an exemplary liquid or atomized electropositive metal 2, Li or Mg for example, as metal nozzle, which in these case at the same time represents the counter-electrode for the HV discharge of the plasma nozzle.

As a result of the applied high voltage $V_{HV}$ and the resultant high-voltage sparking, at the smallest distance between the electrodes in the nozzle, for example, the reaction gas 1, introduced through the second supply means 10 for the reaction gas, is converted into a plasma and is bundled at the plasma nozzle 5, where ultimately a plasma flame 3 of the reaction gas is formed. If the electropositive metal 2 to be burned is then conveyed in a targeted manner, after supply via a first supply means 8 for the electropositive metal, a liquid-metal duct, for example, via the metal nozzle 6 and into the plasma flame 3, it is ignited by virtue of the high temperatures in the plasma flame, and a metal flame 4 is formed.

In the case of this first exemplary embodiment, as illustrated in FIG. 1, an additional atomizing gas 7 can be supplied through a third supply means 9 for the atomizing gas, to be able to atomize the electropositive metal 2.

In the second exemplary embodiment, illustrated in FIG. 2, an alternative atomization of the electropositive metal by a nozzle swirl element 11 is illustrated. The electropositive metal can of course also be atomized in other ways, or else to start with there is no atomization.

In contrast to the construction illustrated in FIGS. 1 and 2, with internal metal nozzle 6 and external plasma nozzle 5, an inverse construction is also conceivable, according to a third exemplary embodiment, in which the plasma nozzle 5 is on the inside and the metal nozzle 6 on the outside. Here, the high-voltage discharge for generating the plasma may be generated, for example, by an additional high-voltage electrode 12 situated in the plasma nozzle 5.

FIG. 4 shows in detail, schematically, the high-voltage discharge in a fourth exemplary embodiment, which corresponds largely to the second exemplary embodiment, but with no nozzle swirl element 11 being present. Shown in detail in this case, schematically, is the high-voltage discharge (HV-discharge) 13 between the plasma nozzle 5 and the metal nozzle 6, with the shortest distance between the two nozzles having been deliberately produced.

The actual local point of the high-voltage discharge and hence the point or region of conversion of the reaction gas into plasma may be set for example via the distance of the anode to the cathode and/or the distance of the metal nozzle 6 to the plasma nozzle 5. The point of the lowest difference is where the insulation pathway is the shortest and therefore there that an HV discharge comes about, as illustrated in FIG. 4. By deliberately making one of the two nozzles of excess height, therefore, it is possible to set the point at which the plasma is formed and the extent of the distance between the electropositive metal 2 and this "plasma point".

A fifth exemplary embodiment with a specific nozzle design is illustrated in FIG. 5. In this case, by way of example, the electropositive metal is provided in the form of a liquid, which has sufficient cohesion within the reaction gas, something which can be ensured appropriately by choice of the electropositive metal, of its temperature, etc., and of the reaction gas, of its flow behavior and flow velocity, etc., of the nozzle construction, etc. On departure from the metal nozzle 6, accordingly, a liquid-metal jet 14 is formed. The liquid-metal jet 14 can be utilized as an electrode in the interior of the plasma nozzle 5, owing to the electrical conductivity of the liquid metal. The high voltage therefore discharges directly between the medium to be burned, the electropositive metal 2, and the plasma nozzle 5. This is unique to the burning of liquid metal, since other fuels such as oil, gasoline, coaldust, etc. possess virtually no electrical conductivity.

A sixth exemplary embodiment is shown in FIG. 6. Illustrated therein is the advantage, for stabilizing the plasma flame 3, for the reaction gas to be steered beforehand onto an exemplary spiral path. This can be realized, for example, by means of a swirl disk 15, which sits in the second supply means 10 for the reaction gas and diverts the gas stream accordingly, as illustrated in FIG. 6.

A seventh exemplary embodiment, which uses a nozzle as constructed in FIG. 1, is shown in FIG. 7, with carbon dioxide being employed as reaction gas 1 and atomizing gas 7, while lithium at a temperature of around 300° C. serves as electropositive metal 2. The exemplary nozzle has diameters d1 of 0.5 mm, d2 of 2 mm, and d3 of 3.5 mm in respect of the supply means or nozzle outlets. The plasma is ignited by a high-voltage generator as high-voltage source, with an applied voltage $U_{HV}$ of 14 kV. Via high-voltage insulators 17 it is possible to prevent ignition at the gas inlet to the nozzle within the supply means. The electropositive metal such as Li, for example, can in this case be added, for example, at a flow rate of 0.5-1 g/s, whereas the reaction gas can be added, for example, with a flow rate of 10 l/min. In this case a stably burning reaction flame is the result.

With the aforementioned exemplary embodiments it is possible in principle, irrespective of the specific nozzle construction, to switch the electrical connection of the high-voltage connection and the corresponding ground connection. This influences merely the constructional direction of the HV discharge, which is relevant for the application described here.

After the ignition of the electropositive metal 2, moreover, the high voltage can simply be switched off, for example, with the metal flame 4 continuing to burn in a self-sustaining way. If the metal flame 4 goes out, it can be reignited by the high voltage at any time.

The present disclosure describes methods and apparati for the igniting and reacting of an electropositive metal with a reaction gas, and more particularly a nozzle for metal burners, liquid-metal burners for example, with integrated plasma ignition means.

What is claimed is:

1. A method for generating energy, the method comprising:

supplying a reaction gas and an electropositive metal separately to at least one nozzle having coaxial electrodes;

wherein the electropositive metal at least one material selected from the group consisting of: alkali metals, alkaline earth metals, aluminum, zinc, mixtures;

combining the reaction gas and the electropositive metal at a mixing point in the at least one nozzle to burn the reaction gas with the electropositive metal; and converting the reaction gas into a plasma with a high-voltage discharge between the anode and the cathode upstream of the mixing point.

2. The method as claimed in claim 1, further comprising generating the plasma within the at least one nozzle with a high-voltage discharge in the range from 4 to 100 kV where the nozzle serves as an electrode.

3. The method as claimed in claim 1, further comprising:

supplying an atomizing gas to the at least one nozzle; and atomizing the electropositive metal with the atomizing gas.

4. The method as claimed in claim 1, further comprising liquefying or atomizing the electropositive metal before supply into the at least one nozzle.

5. The method as claimed in claim 1, where, by placement of a contact, the electropositive metal serves as electrode during plasma generation.

6. An apparatus for generating energy by burning a reaction gas with an electropositive metal, the apparatus comprising:

at least one nozzle to atomize a mixture of the electropositive metal and the reaction gas, the at least one nozzle including coaxial electrodes;

a first supply to supply the electropositive metal to the at least one nozzle;

a second supply to supply the reaction gas to the at least one nozzle;

wherein the at least one nozzle defines a mixing point where streams of the electropositive metal and the reaction gas combine;

an ignition device on or in the at least one nozzle to convert the reaction gas within the at least one nozzle into a plasma with a high-voltage discharge between the electrodes upstream of the mixing point.

7. The apparatus as claimed in claim 6, further comprising a third supply to supply an atomizing gas to the at least one nozzle.

8. The apparatus as claimed in claim 6, wherein one or more of the first supply or the second supply or the third supply opens out in the at least one nozzle.

9. The apparatus as claimed in claim 6, wherein the at least one nozzle comprises a single-fluid nozzle or a two-fluid nozzle.

10. The apparatus as claimed in claim 6, further comprising a melting device or a comminuting device to melt or to comminute the electropositive metal upstream of or in the first supply.

11. The apparatus as claimed in claim 6, wherein the at least one nozzle comprises a metal nozzle or a reaction gas nozzle or an atomizing gas nozzle;

wherein:

the first supply means opens out in the metal nozzle; or the second supply opens out in the reaction gas nozzle; or the third supply opens out in the atomizing gas nozzle.

12. The apparatus as claimed in claim 11, wherein:

the first supply is disposed coaxially within the second supply;

the second supply opens out into the reaction gas nozzle; and the first supply supplies the electropositive metal within the at least one nozzle.

13. The apparatus as claimed in claim 6, wherein the ignition device comprises a high-voltage ignition device having a high-voltage source with a voltage in the range from 4 to 100 kV, the high-voltage source connected to two electrodes, wherein:

i) the first supply or the electropositive metal itself, and the second supply; or ii) the first supply or the electropositive metal itself, and the third supply; or iii) the second supply and the third supply;

are each designed as one electrode and the shortest distance between the respective electrodes is formed within the at least one nozzle.

14. The apparatus as claimed in claim 13, wherein the electropositive metal comprises an electrode and wherein, after the supply by the first supply, the electropositive metal passes as a coherent metal body or as a dense cloud of metal particles into the at least one nozzle, and the ignition device comprises the at least one nozzle and the electropositive metal.

* * * * *